United States Patent [19]

Miller

[11] 4,169,542

[45] Oct. 2, 1979

[54] DISPENSER FOR CUP HOLDERS

[76] Inventor: Walter L. Miller, 1009 Main St., Delta, Colo. 81416

[21] Appl. No.: 828,336

[22] Filed: Aug. 29, 1977

[51] Int. Cl.² .............................................. A47F 1/08
[52] U.S. Cl. .................... 221/303; 312/43; D7/71
[58] Field of Search ........................ 221/303–310, 221/311, 312 R, 262, 277; 312/43; 211/49 D, 49 R; 224/45 G; 206/499, 502, 510; 229/1.5 H; D6/115; D7/70, 71

[56] References Cited

U.S. PATENT DOCUMENTS

| 1,807,400 | 5/1931 | Gallagher | 221/307 X |
| 2,437,956 | 3/1948 | Hessel | 221/307 |
| 2,826,471 | 3/1958 | Fonda | 221/311 |
| 3,788,487 | 1/1974 | Dawson | 221/45 X |

FOREIGN PATENT DOCUMENTS

| 627830 | 3/1936 | Fed. Rep. of Germany | 221/303 |
| 2400833 | 7/1975 | Fed. Rep. of Germany | 221/307 |

OTHER PUBLICATIONS

Sweetheart Casual Cups, Price List of Apr. 4, 1977, p. 17, Sweetheart Divisions of Maryland Cup Corp.

*Primary Examiner*—Francis J. Bartuska

[57] ABSTRACT

A dispenser for cup holders for flexible cup liners, in which the cup holders are stacked one on top of the other in a tube having a slot in the side thereof for receiving the handles of the stacked cup holders and the slot having an inlet slot portion for receiving the handles, an offset slot portion in which the handle of the lowest cup can rotate, and a discharge slot portion for discharging the lowest cup from the bottom opening of the tube after rotation of its handle.

7 Claims, 6 Drawing Figures

U.S. Patent   Oct. 2, 1979   4,169,542
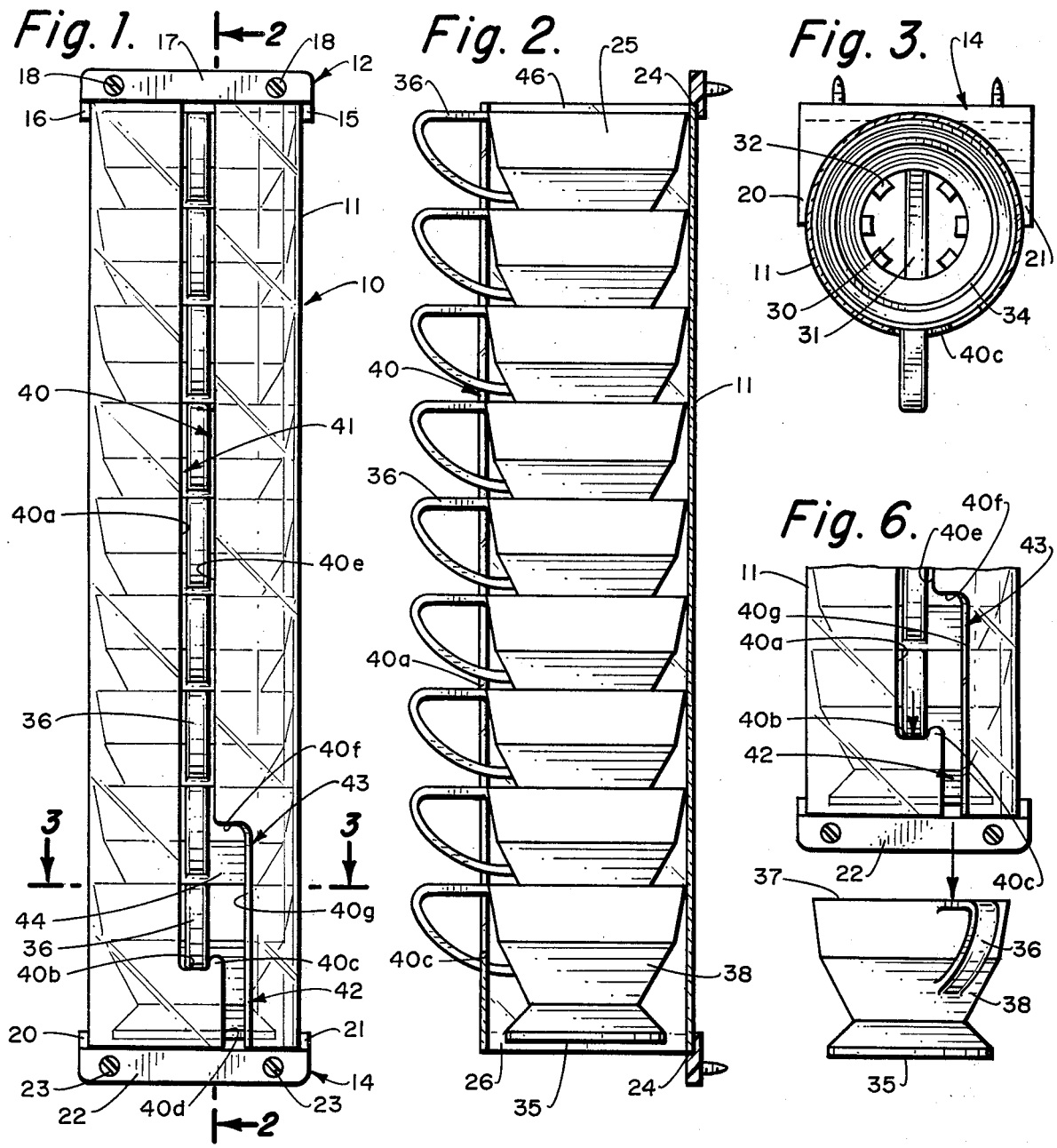
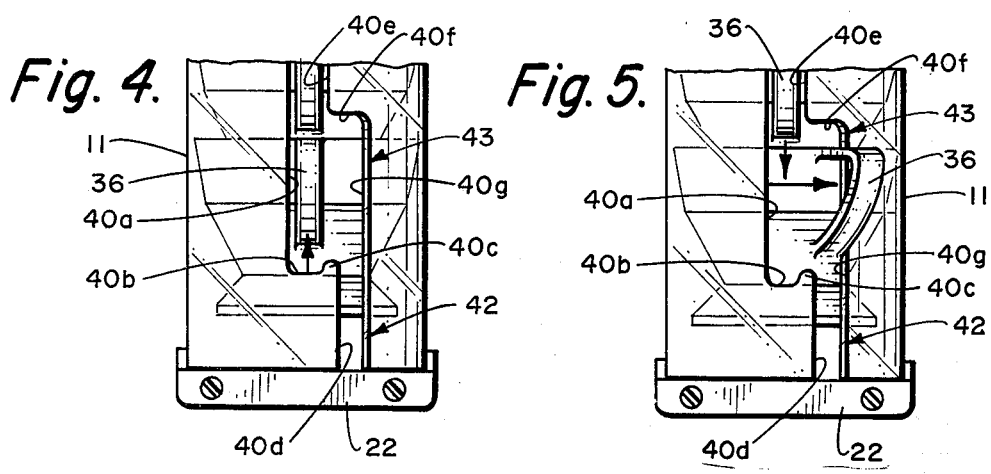

DISPENSER FOR CUP HOLDERS

BACKGROUND OF THE INVENTION

It is customary in industrial lunch rooms and offices where beverages are dispensed to utilize a rigid cup holder into which is inserted a thin flexible cup liner. The liner is truncated in shape with a flange at the bottom which snaps into position at the bottom of the holder. The cup holder can be made of a rigid plastic and will be retained at the dispensing location. The cup liners are usually stacked in cardboard containers and various devices are available for dispensing the liners one at a time from the stack prior to insetion into the cup holder.

It is also desirable to have a dispenser for the cup holders since they are more expensive than the liners and are reused at the serving location. A device for dispensing cup holders is disclosed in U.S. Pat. No. 3,788,487. In this device, the cup holders are placed in a cylindrical passage with the cup handles sticking out through an open slot in the side of the passage. However, it is necessary to lift each cup holder upwardly in the reverse direction from which it was inserted in the passage in order to remove it. Thus, when only several cup holders are at the bottom of the passage, it is necessary to move these cup holders a considerable distance in order to remove them.

SUMMARY OF THE INENTION

A cup holder for flexible cup liners is provided by the present invention which permits the cup holders to be stacked, one on top of the other, in a cylindrical tube. Instead of having to remove the cup holders from the tube upwardly in the reverse direction to which they were inserted, the cup holders are removed one at a time from the bottom of the tube. The tube contains a vertical slot extending from the top to the bottom of the tube and the cup holders are introduced into the top opening in the tube. The handles of the stacked cup holders enter the inlet portion of the slot at the top and extend through the slot as the handles move downwardly. The slot has an enlarged offset portion near the bottom of the tube which permits the handle of the lowest cup holder to engage a transverse support surface in order to support the holders stacked above it. When it is desired to remove the lowest cup holder from the dispenser, it is manually rotated by moving the handle in an opening formed by the offset portion until the handle lines up with a discharge slot. The height of the opening in the offset portion must be greater than the height of the cup holder handle to permit the handle to rotate and the width of the opening must be great enough to permit the handle to move from the inlet slot portion to the discharge inlet portion.

With such a structure, it is possible to remove the cup holders one after another from the bottom opening of the tube without having to lift the cup holders from the bottom of the tube up to the top of the tube. Also, the transverse edge of the slot offset portion can contain a slight upward rise which prevents accidental movement of the lowest handle from the inlet slot portion into position over the discharge slot portion.

BRIEF DESCRIPTION OF THE DRAWINGS

FIG. 1 is a side elevational view showing the dispenser in the upright position with the handles for the cup holders projecting through the slot in the dispenser tube;

FIG. 2 is a vertical section along line 2—2 of FIG. 1 illustrating the mounting brackets for the tube;

FIG. 3 is a horizontal section along line 3—3 of FIG. 1 illustrating the interior of a cup holder;

FIG. 4 is a partial side elevational view similar to FIG. 1 showing the first step in the removal of a cup holder from the dispenser;

FIG. 5 is a partial side elevational view similar to FIG. 1 showing the cup holder handle in position to permit withdrawal of the cup holder; and FIG. 6 is a partial side elevational view similar to FIG. 1 showing the lowest cup holder removed from the dispenser.

DETAILED DESCRIPTION OF THE PREFERRED EMBODIMENT

Referring to FIGS. 1 and 2, the cup holder dispenser 10 consists of a cylindrical tube 11 preferably constructed of a side wall of a clear plastic material. The tube can be suppported upright on any flat surface by a top bracket 12 and bottom bracket 14. Top bracket 12 has curved arms 15 and 16 which partially surrounds the tube and are cemented or otherwise secured thereto. Also, a straight flange 17 projects upward and contains openings for fasteners 18 which can be any suitable fastener for connecting the bracket 12 to a wall surface or other surface. In a similar manner, bracket 14 has curved arms 20 and 21 which projects partially around the tube 11 and are cemeted or affixed thereto in any suitable manner. The bracket 14 has a downwardly extending flange 22 which contains openings for fasteners 23 so that the lower end of the tube 11 can be attached to a flat supporting surface. Each of the brackets 12 and 14 can have a lip or flange 24 which serves to position the brackets at the top and the bottom of tube 11. It is understood that any suitable mounting structure can be utilized to support the tube 11 in a vertical position in a location for dispensing cup holders 25 from the bottom opening 26 of the tube 11.

Each of the cup holders 25 are made of a rigid molded plastic material and are designed to be used with thin plastic liners which are disposable. Since the cup holders 25 are to be used over and over again, it is necessary that they be always available at the liquid dispensing location.

As illustrated in FIG. 3, each cup holder has a bottom opening 30 across which extends a bar 31 and fingers 32 are located slightly above the bar to engage a rim on the cup liner. Also, each cup holder has a ledge 34 which receives the base 35 of another cup so that the cup holders can be stacked one on top of the other. Each cup holder has a handle 36 extending from the top edge 37 of the holder and connected with an intermdiate tapered portion 38.

Tube 11 contains a slot 40 which extends the full length of the tube and is divided into an inlet slot portion 41, discharge slot portion 42, and an offset slot portion 43. As illustrated in FIG. 2, the handles 36, when in stacked condition, extend to one side of tube 11 through slot 40 and each handle is separated from handles of adjacent cup holders.

One side of the slot 40 has a vertical edge 40a extending vertically downwardly to a transverse offset edge 40b which terminates in a raised edge 40c. The raised edge then connects with a shorter vertical edge 40d. The other side of the slot 40 has a vertical edge 40e extending vertically downwardly to a transverse offset edge 40f which then connects with a shorter vertical edge 40g. The opposite edges 40a and 40e form the inlet slot portion 41; the edges 40a, 40b, 40c, 40f and 40g form the offset slot portion 43; and the opposite edges 40d and 40g form the discharge slot portion 42. The offset slot portion defines an opening 44 into which the handle 36 of the lowest cup holder can move during removal from the dispenser 10. The height of opening 44 is at least slightly greater than the height of the highest handle to be dispensed and the width of the opening is preferably slightly greater than twice the width of the widest handle to be dispensed. With such dimensions, the handle of the lowest cup holder can be gripped and rotated into opening 44 in order to become positioned over the discharge slot portion 42. The raised edge 40c is optional and when used, the stack of cup holders must be raised by force on the lowest handle before the handle can be roated as illustrated by FIG. 4.

As illustrated in FIG. 1, a plurality of cup holders 25 are loaded in the top opening 46 of the tube 11 with handles 36 projecting out from slot 40 and the handle of the lowest cup engages the transverse edge 40b to support the cup holders. The ledge 34 of each cup holder engages the bottom 35 of the cup holder directly above to maintain the holder in stacked position, with each of the handles projecting outwardly from slot 40. When it is desired to remove the bottom cup holder 25 from the dispenser 10, the handle 36 of the holder is gripped and all the cup holders are raised upwardly to permit the handle 36 to clear the raised surface 40c (see FIG. 4). The handle 36 of the lowest cup holder is then rotated into the space 44 and adjacent to the edge 40g so that the handle is directly above the discharged slot portion 42, formed by edges 40d and 40g. The rotated position of the cup holders is illustrated in FIG. 5. The handle then moves through the discharge slot portion and out of the dispenser as illustrated in FIG. 6. After the handle of the lowest holder is rotated, the stack of holders moves downwardly until the handle on the holder directly above engages the transverse surface 40b and this next cup is now in position for removal in the same manner from the dispenser when needed.

The purpose of the raised surface 40c is to prevent the handle 36 of the lowest cup holder from being accidently moved into the opening 44 and over the discharge slot portion 43 so that the cup holder would fall from the dispenser 10 when it is not needed. Normally, the weight of the cup holders in the stack above the lowest cup holder will hold the handle of the bottom holder is position, but the raised surface 40c makes accidental removal of the bottom holder more difficult.

It is understood that the width of the slot portions 41 and 42 will be sufficient to receive the widest cup handle that will be utilized for the dispenser 10. Also, the height of opening 44 between surfaces 40b and 40f is such that it will permit handle 36 of the lowest cup holder to be raised upwardly to clear the raised surface 40c. However, the height will not be great enough to permit rotation of the holder directly above the lowest holder and such rotation will be stopped by the lower portion of edge 40e. (see FIG. 5) Further, since the inlet and discharge slot portion are offset from one another, the width of opening 44 must be such as to provide a transverse support surface 40b adjacent discharge slot portion 42. Preferably, the transverse support surface 40b should be at least the width of the handle so that the width of the opening 44 between edges 40a and 40g would be at least twice the width of the handle.

It is apparent that the number and size of the holders which can be dispensed will depend upon the size of the dispenser and the size of the various slot portions. While the tube 11 is illustrated as round, the dispenser could be shaped to accommodate holders of various shapes and sizes. When tube 11 is made of plastic, the individual surfaces and edges can be smooth so they will not injure the hands when removing a cup holder. As holders are removed from the dispenser, the remaining holders will still form a stack and all holders will be removed through bottom opening 26. Except for the handles, the cup holders are continually covered by the tube 11 so that the dispenser maintains the cup holders in sanitary condition.

What is claimed is:

1. A dispenser for a plurality of stacked cup holders each having a projecting handle comprising:
    a tube comprising a side wall for confining said cup holders in a vertically stacked relationship;
    a slot in said side wall extending the full vertical length of said tube;
    said slot having a first slot portion extending downwardly from the top of said tube through which said handles project outwardly of said tube one above the other;
    a second slot portion of said slot intermediate the ends of said tube providing an opening for permitting the handle of the lowest cup holder to rotate away from the handle of the adjacent cup holder and permitting the adjacent cup holder to drop into the space previously occupied by said lowest cup holder; and
    a third slot portion of said slot extending downwardly from said second slot portion of the bottom of said tube for receiving the handle of said lowest cup holder after rotation and permitting said lowest cup holder to be removed from said tube.

2. A dispenser as defined in claim 1
    said second slot portion having a transverse edge for supporting said lowest cup holder handle prior to rotation, and a raised surface on said transverse edge for resisting the rotation of said lowest cup holder handle.

3. A dispenser as defined in claim 2
    said first slot portion resisting rotation of the handle of said adjacent cup holder during rotation of the handle of said lowest cup holder.

4. A dispenser for a plurality of vertically stacked cup holders each having a projecting handle comprising:
    a tube comprising a side wall for confining said cup holders in a vertical stacked relationship;
    a slot in said side wall extending from the top to the bottom of said tube;
    said slot having a first side comprising a first vertical edge extending from the top of said tube and connected with a first transverse edge in turn connected to a first shorter vertical edge extending to the bottom of said tube;
    a second side for said slot comprising a second vertical edge extending from the top of said tube and connected with a second transverse edge in turn connected to a second shorter vertical edge extending to the bottom of said tube;
    said first and second vertical edges being spaced apart to receive said handles of said stacked cup holders;

said first transverse edge being spaced below said second transverse edge and extending in the same direction as said second transverse edge and said first shorter vertical edge being of less length than said second shorter vertical edge to provide an opening for rotation of only the handle of the lowest cup holder; and said first and second shorter vertical edges being spaced apart to receive the handle of said lowest cup holder after said rotation.

5. A dispenser as defined in claim 4, said first and second vertical edges being opposite the handle of the cup holder adjacent said lowest cup holder during said rotation to prevent rotation of said adjacent cup holder.

6. A dispenser as defined in claim 4, said first transverse edge having a raised portion to prevent said rotation of said lowest cup holder without slightly raising the other cup holders in the stack.

7. A dispenser for a plurality of stacked cup holders, each having a projecting handle comprising:

first means for confining said cup holders in a vertically stacked relationship, said first means comprising wall means defining a passage for receiving each of said cup holders at the top thereof and dispensing said cup holders at the bottom thereof;

said first means comprising second downwardly extending means in said wall means for guiding said handles of said stacked holders from the top of said first means downwardly;

an opening through said wall means below said second means providing for rotation of the bottom holder and handle relative to the other stacked holders;

said opening having a transverse edge for supporting the handle of said bottom holder when in said stacked relationship; and a slot in said wall means displaced from said second means and extending from said opening to the bottom of said first means for passage of the handle of said bottom holder out of said first means to dispense said bottom holder from said first means.

* * * * *